(12) United States Patent
Brown

(10) Patent No.: US 10,363,772 B2
(45) Date of Patent: Jul. 30, 2019

(54) TURKEY FAN FAVORITE

(71) Applicant: Charles Derron Brown, Rydal, GA (US)

(72) Inventor: Charles Derron Brown, Rydal, GA (US)

(*) Notice: Subject to any disclaimer, the term of this patent is extended or adjusted under 35 U.S.C. 154(b) by 235 days.

(21) Appl. No.: 15/186,355

(22) Filed: Jun. 17, 2016

(65) Prior Publication Data
US 2017/0361643 A1   Dec. 21, 2017

(51) Int. Cl.
| | |
|---|---|
| *B44C 5/04* | (2006.01) |
| *B44C 5/02* | (2006.01) |
| *A01M 31/06* | (2006.01) |
| *F16M 13/02* | (2006.01) |
| *B44C 5/06* | (2006.01) |

(52) U.S. Cl.
CPC .............. *B44C 5/02* (2013.01); *A01M 31/06* (2013.01); *B44C 5/06* (2013.01); *F16M 13/022* (2013.01)

(58) Field of Classification Search
None
See application file for complete search history.

(56) References Cited

U.S. PATENT DOCUMENTS

| | | | | |
|---|---|---|---|---|
| 5,064,725 A | * | 11/1991 | Acker | B44C 5/02 428/16 |
| 5,437,935 A | * | 8/1995 | Fredeen | B44C 5/02 428/16 |
| 8,168,305 B1 | * | 5/2012 | Peterson | B44C 5/02 211/168 |
| 2004/0250461 A1 | * | 12/2004 | Dryer | A01M 31/06 43/2 |
| 2013/0045470 A1 | * | 2/2013 | Bain | B44C 5/02 434/296 |

* cited by examiner

*Primary Examiner* — Sunit Pandya

(57) ABSTRACT

A display device for spreading a turkey's tail feathers in a fan-like display is provided. The device consists of a U-shape with 3 rubber quill clips, 1 located at the top, 1 located on one end of the device and 1 located on remaining end of the device. The rubber clips allow the quills in the middle of the fan as well as the quills near the base on opposite sides to be used to hold the turkey fan in a set position. When installed the device is invisible to view. This device is a multipurpose toot and can be used for taxidermy use in preserving the turkey fan. This device may be used as a mounting mechanism for wall display. A mounting mechanism may further be provided for the mounting of an object to the turkey fan such as the beard, or a pole for the use of the fan as a decoy in the field or a mount on the wall or shelf.

2 Claims, 10 Drawing Sheets

TURKEY FAN FAVORITE

BACKGROUND

It has been a tradition among hunters to pose for photographs of their prey and to mount the prey for later viewing. When the prey is a turkey, hunters posing for a trophy shot with the bird attempt to spread its tail feathers in order to properly display them for the photo. This requires that the hunter use one or both hands to spread the tail feathers and to hold them in place during the photo. Attempts to simultaneously hold the hunter's weapon are difficult, clumsy and may cause an accident if the weapon accidently falls. Documenting the harvest with quality pictures is very important to the outdoorsmen. Taxidermy work is a way to preserve the memory to share and hang on the wall. It has been a struggle and takes up a lot of space and requires multiple steps to complete the process. This device will not only save time by applying the device but also will save space. Having the turkey fan mount complete, hunters want to display it on the wall. This device has a built in hanger for easy installment to enjoy their harvest. This device will serve as a multi tool to spread the tail fan of a freshly harvested turkey for quality pictures, to preserving the fan and lastly to hang it on the wall.

Presently there is no device like as stated above to solve the problems to spread the tail fan feathers in the field for photos hands free and/or for taxidermy or displaying the fan combined.

SUMMARY

The present invention is directed to solving the above problems by providing a simple hands-free device/tool for spreading the tail feathers of a recently harvested turkey, thereby freeing the hunter to safely pose for a quality picture and capture the memory. This will enable the hunter to hold his weapon safely and not require the use of their hands to hold the tail fan. Likewise, the present invention solves the problem of displaying the bird's feathers only (including tail fan and optionally also cape and beard), by providing a device that attaches to the back of the tail fan, spreading the tail feathers while remaining invisible to the viewer from the front. This latter function is beneficial both for hunter's home use and for use by taxidermist.

The display device of the present invention functions by spreading a turkey's tail feathers in a fan-like display about a central hub from which the tail feathers extend, u will apply the device to the rear of the turkey fan. Each of the tail feathers having a quill that is attached to the hub will be applied in 3 places on the device to the clamps provided on the device. The base feather quills located on each side of the hub will be used and are attached to the hub along with the most central quill.

The U-shape design eliminates any obstructions the hub may cause and works flawlessly to hold the fan in a realistic manner for quality photos, taxidermy and wall placement.

DETAILED DESCRIPTION

Figure 1A:
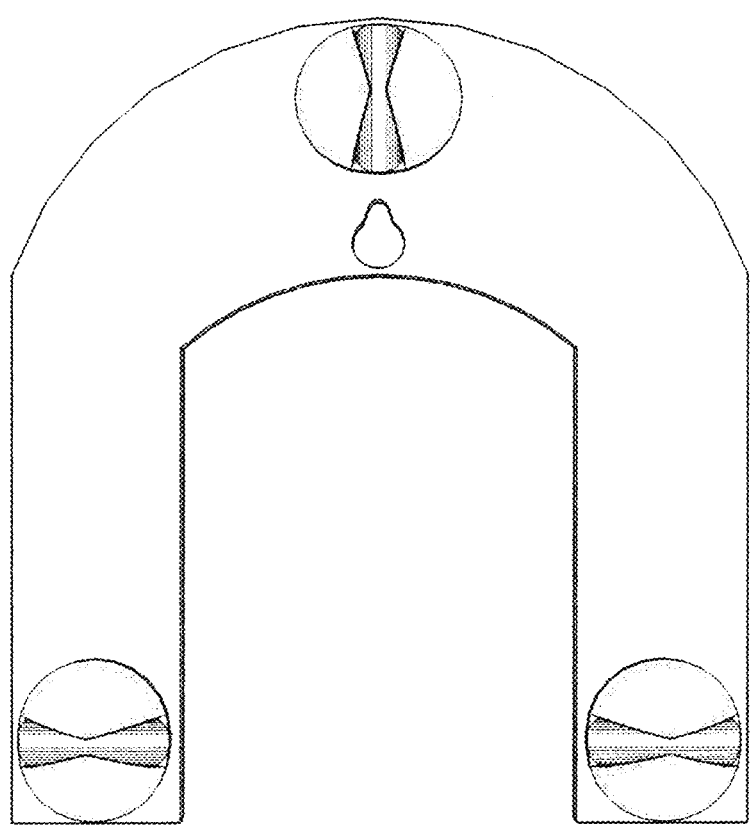
FIG. 1A, shows a mechanical drawing of a front perspective view from top to bottom of device of one version of the present invention.
Figure 1B:
FIG. 1B, shows right side view of the multi tool device from top to bottom. (The left side view is the same) Noted are the turkey quill clips from this angle located at the top, right and left on the device shown on FIG. 2
Figure 1C:
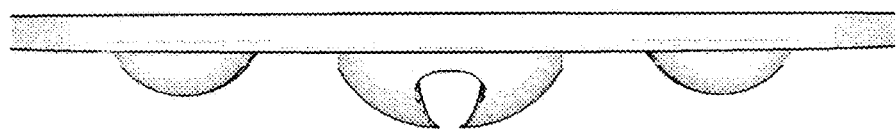
FIG. 1C, shows a top side view of the device, showing the 3 turkey quill clips located towards top of the device and on the right and left of device.
Figure 1D:
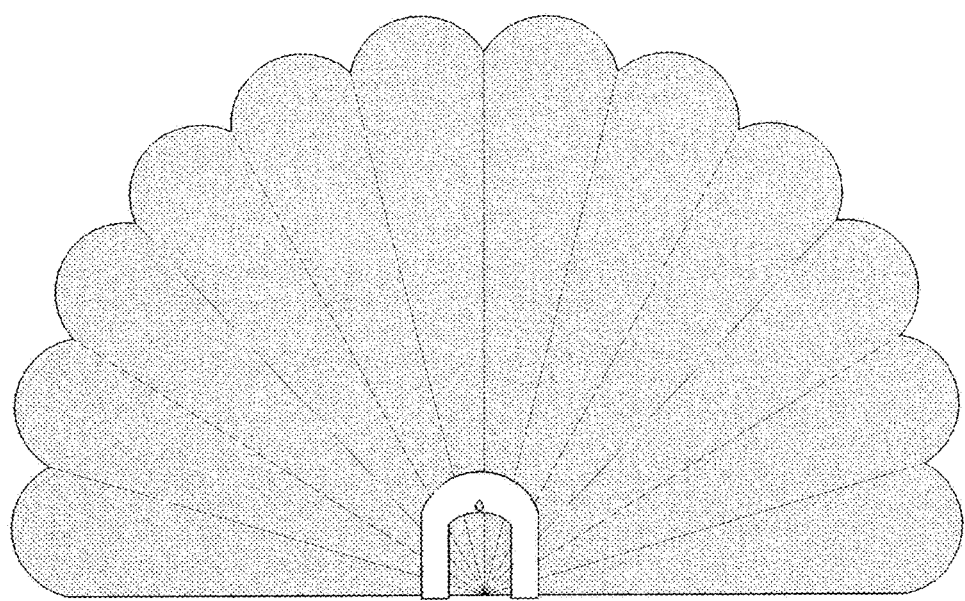
FIG. 1D, shows the device of the present invention in use from a rear view of the turkey fan used in the field right after harvest for photos, taxidermy prep, and for display on the wall. Note the turkey quill clips are clipped to turkey feathers attached to the hub.

Referring now specifically to the figures, in which identical or similar parts are designed by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims. For example, the present invention may be used to display and or mount tail fans of other types of birds in addition to turkey tail fans.

It should also be understood that, while the methods disclosed herein may be described and shown with reference to particular steps preformed in a particular order, these steps may be combined, sub-divided, or re-ordered to form an equivalent method without departing from the teachings of the present invention. Accordingly, unless specifically indicated herein, the order and grouping of the steps is not a limitation of the present invention.

As mentioned above, the present invention is directed to providing a simple hands-free tool for spreading the turkey tail feathers of a recently harvested turkey for quality pictures while not being visible from the front for realistic pictures, freeing a hunter's hands to pose safely with their trophy in the field, as a turkey fan saver when used in taxidermy, and hanging on the wall when displaying the fan on the wall. This later function is beneficial both for the hunter's home use and for use by taxidermist.

Figure 2A:
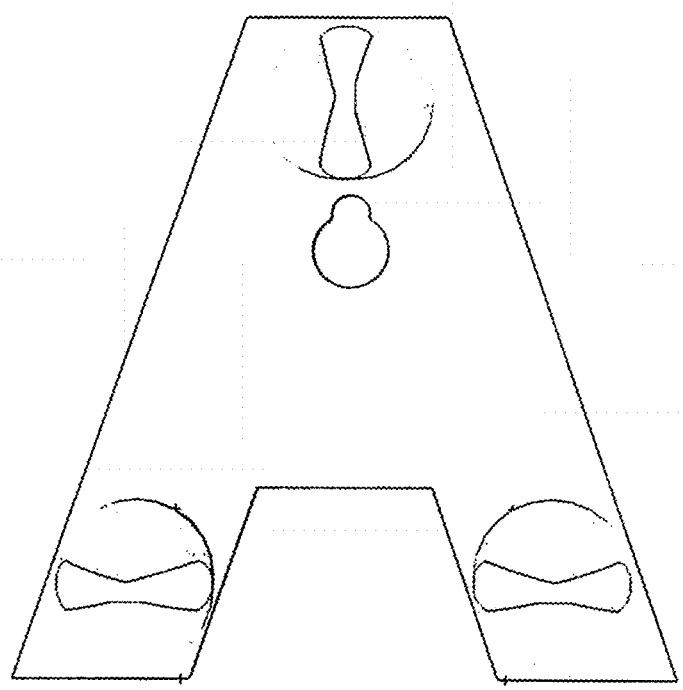
FIG. 2A, shows an alternate shaped device to be used in the same like manner. 2a shows a mechanical drawing of a front perspective view from top to bottom of device of another version of the present invention. Turkey quill clips are located above wall hanger mount hole on top of device intended for the center quill. 2 clips are located opposite each other, one on the right, one on the left of the device intended for turkey quills located lastly attached to the hub. Wall hanger mounting hole is located at top of the device below the center turkey quill clip.
Figure 2B:
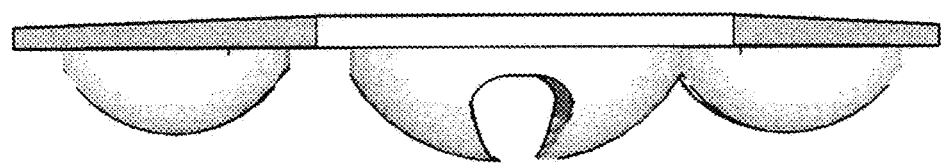
FIG. 2B, shows a top view of the device, showing the 3 turkey quill clips located towards top of the device and on the right and left of device.
Figure 2C:
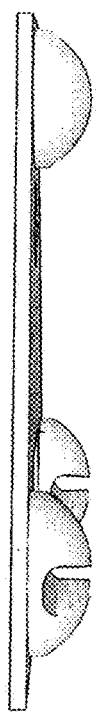
FIG. 2C, shows a left side view of the multi tool device from top to bottom. (The right side view is the same) Noted are the turkey quill clips from this angle located at the top, right and left on the device shown.
Figure 3A:
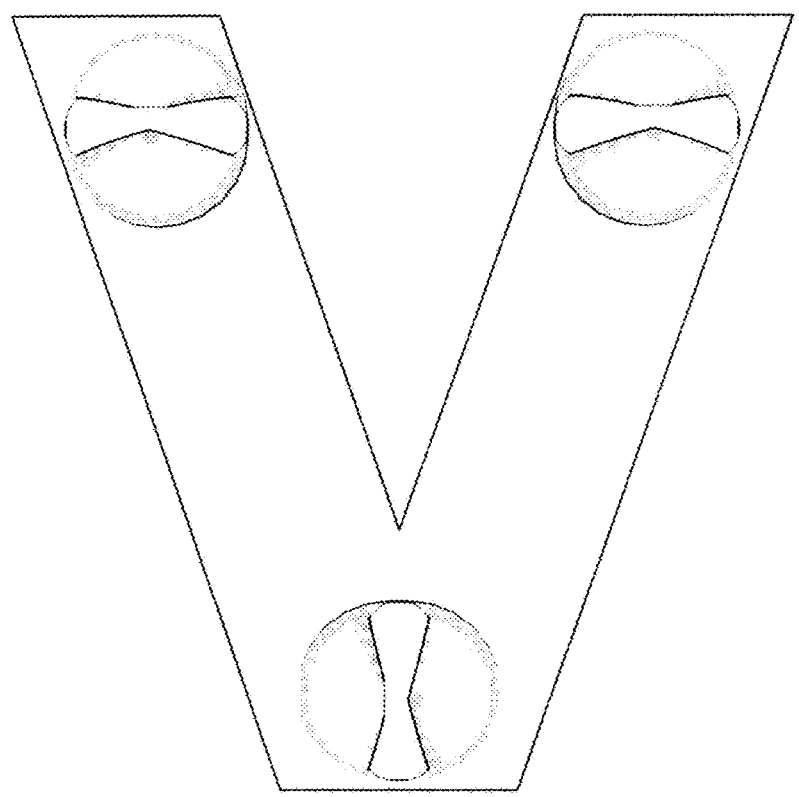
FIG. 3A, shows and inverted view of the device with the turkey quill clips at the right and left side and at the top of device.
Figure 3B:
FIG. 3B, shows the left side view inverted with the turkey quill clips at the top of device and the bottom of device.
Figure 3C:
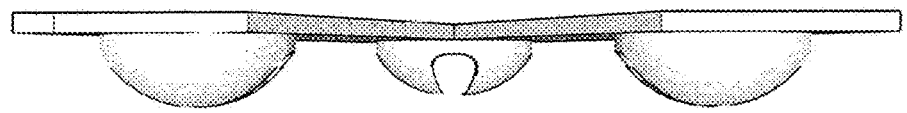
FIG. 3C, shows the bottom view of device with the turkey quill clips on the left and right side of device and at the top.

Referring to FIGS. 1 thru 3 mechanical drawings of several views of one version of the display tool shown (I.E. front view from top to bottom, bottom comprises of both ends of the tool). Also shown is the mounting hole for when device/tool is being used to display on the wall. (Located at top of tool, just below top turkey fan quill clip).

Turkey quills clips are located 1) above wall hanger mount hole on top of device intended for the center quill(s). 2 quill clips are located opposite each other, one on the right, one on the left of device intended for turkey quills located lastly attached to the hub. Wall hanger mounting hole is located at top of the device below the center turkey quill clip.

The turkey fan quill clips are designed to fit appropriately around the fan quills to hold the turkey fan in a "fanned position". Quill clips will be located top center of device and at both ends of device, when device is in use the bottom quill clips will be near the hub of the turkey fan. Quill clips are rubber on this version of display as seen in FIG. 1 thru 3, but can be made of different material in other versions such as metal, wood, plastics or by other means.

The quills of a turkey's tail feathers are hollow and will tend to compress about 0.020 inches (0.05 cm) when squeezed. The quill clips take advantage of this by the turkey fan quills snapping into place into our rubber clips as shown in this version of invention. This will lock the turkey quills into a fixed natural position when the turkey fan is spread out. The device will hold securely on freshly harvested turkey and on feathers that are in the drying period or when displayed on the wall.

The device itself in FIG. 1 thru 3 is made of a polycarbonate plastic but not limited to stated material. Other versions may be comprised of metal, wood, plastics or by other means.

When the body of the device and the rubber quill holders are in use and attached to the back side of the turkey tail fan at the top middle quill and on opposite sides of the hub, it will eliminated the resistance of the turkey fan to return to its normal relaxed position, (i.e., non-fanned position) This enables the device to create a strong hold to keep the tail feathers spread. This has the advantage of providing a display of the feathers unobstructed by display device itself, which is located entirely behind the feather display and out of sight of a viewer. This device provides an extremely easy way to attach to a bird in the field in a rapid and timely manner. The device provides a hands-free display of the tail fan which helps create quality photos of the harvested game and hunter in the field. The device serves as a great way to preserve the tail fan.

Although the present invention has been described in considerable detail with reference to certain preferred versions thereof, other versions are possible. Therefore, the spirit and scope of the appended claims should not be limited to the description of the preferred versions contained herein."

The invention claimed is:

1. A device for spreading a turkey's tail feathers in a fan-like display utilizing a four and three quarter inch wide and five and a half inches tall U shaped device used to fully hold open a turkey's tail feathers and attaching two rubber clips to the opposing outside quill at base of the feathers on opposite sides of the fan-like display, that are attached to the turkey's rear body mass and attaching a center clip to the turkey's center vertical feather quill at the base of middle feather to fully spread open and extend tail in a quality fan like position and using locking clips attached to the feather quills and remaining unseen from front of tail while utilizing a hole made into the device at the top center to hang on a wall.

2. The device of claim 1 uses a notched hole made into the center of device to hang on a nail or screw on the wall.

* * * * *